Jan. 24, 1967  K. A. WOHL  3,300,076
PARTITIVE STRUCTURAL UNIT
Filed March 4, 1965  8 Sheets-Sheet 1

Fig. 1

INVENTOR.
Kurt A. Wohl
BY
ATTORNEY

INVENTOR.
Kurt A. Wohl

ATTORNEY

Jan. 24, 1967  K. A. WOHL  3,300,076
PARTITIVE STRUCTURAL UNIT
Filed March 4, 1965  8 Sheets-Sheet 3

INVENTOR.
Kurt A. Wohl
BY
ATTORNEY

Jan. 24, 1967 K. A. WOHL 3,300,076
PARTITIVE STRUCTURAL UNIT
Filed March 4, 1965 8 Sheets-Sheet 4

INVENTOR.
Kurt A. Wohl
BY
ATTORNEY

INVENTOR.
Kurt A. Wohl
BY
ATTORNEY

United States Patent Office 3,300,076
Patented Jan. 24, 1967

3,300,076
PARTITIVE STRUCTURAL UNIT
Kurt A. Wohl, Elmira, N.Y., assignor to Corning Glass Works, Corning, N.Y., a corporation of New York
Filed Mar. 4, 1965, Ser. No. 437,108
22 Claims. (Cl. 217—23)

The present invention relates to a partitive structural unit and more particularly to a spacer insert which can be erected from a flat sheet of material and inserted into a container for segregating objects, particularly frangible articles to be stored or shipped, into cells and protecting said objects from abrading one another. Objects contained therein are protected from injuries to their surfaces and from injuries due to striking one another and due to superimposed loads.

While some known partition members may be aesthetically attractive with no flutes or corrugating medium visible when erected, they offer little or no longitudinal protection between top portions of adjacent cells, due to an upper arch construction inherently formed upon erection. Some known designs of partition members, because of the considerable amount of inter-folding necessary to erect the partition, require more board, on a square foot basis, than a standard slotted partition for the same cell size, and accordingly are extremely costly. Other known partition members are limited to only providing separation between two cell rows; thus when one dozen or two dozen packs are required, two or three partition members would be required, with severe filling problems arising due to the non-rigid nature and internesting problem of the separate partition members.

Other forms of partition members divide packaged contents into rows three cells wide; however, interior cells have large voids in the lower partition walls, and although the contents of such cells may have a snug fit at the top of a separating arch, no circumferential restraint is provided at the bottom. Thus, the cell contents can develop substantial momentum during any movement of the container which may result in appreciable forces leading to container failure and breakage.

An object of the present invention is to provide a partitive structural unit having such design as to provide separated cells to protect various articles contained in said cells from abrasion and destruction.

Another object is to provide such partitive structural unit having a design requiring a minimum of material in comparison to standard partition members for the same package contents.

A further object is to provide positive top-to-bottom compression protection between adjacent ware articles.

An additional object is to provide a slit, cut and scored blank on a continuous web of material.

A further object is to provide selective wall protection as chosen at potential contact areas between adjacent cells in a container.

Another object is to provide a spacer insert that exhibits a weight reduction with respect to known packaging members.

An additional object is to provide a tighter package through less overlapping of components.

Other objects and advantages of the present invention will be shown in the following detailed description of preferred embodiments thereof as illustrated in the accompanying drawings in which.

While the various illustrations and parts of this invention have been and will be referred to as being located in an upper or lower, right or left position and moving or positioned downwardly or upwardly and to the right or left, it will be understood that this is done solely for the purpose of facilitating description and such references relate only to the relative positions or movements of the parts as shown in the accompanying drawings.

Figure 1:
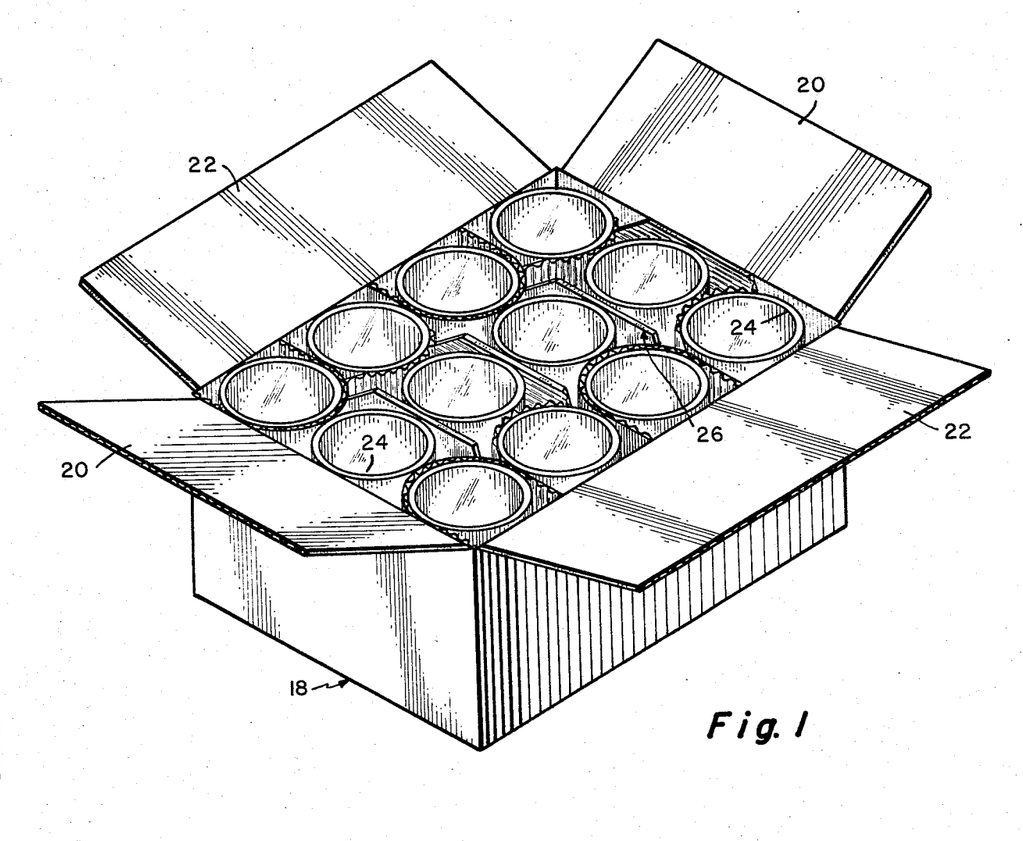
FIG. 1 is an isometric view of a container, such as a boxlike receptacle or carton, having a spacer insert in accordance with the present invention situated therein and containing objects, such as glasses, positioned within cells in said spacer insert.

Referring now to the drawings, in FIG. 1 there is shown a conventional packing box or carton 18 having the usual pairs of inner flaps 20 and outer flaps 22 attached to its top peripheral edges. Objects 24, such as tumblers, bottles, jars, or other commodities, are positioned inside said carton 18, separated from one another by an erected spacer insert or partitive structural unit 26. The spacer insert 26 provides separate cells for said objects. Each cell is intended to receive at least one of said objects and provide protection at all potential contact areas of the adjacent objects.

Figure 2:
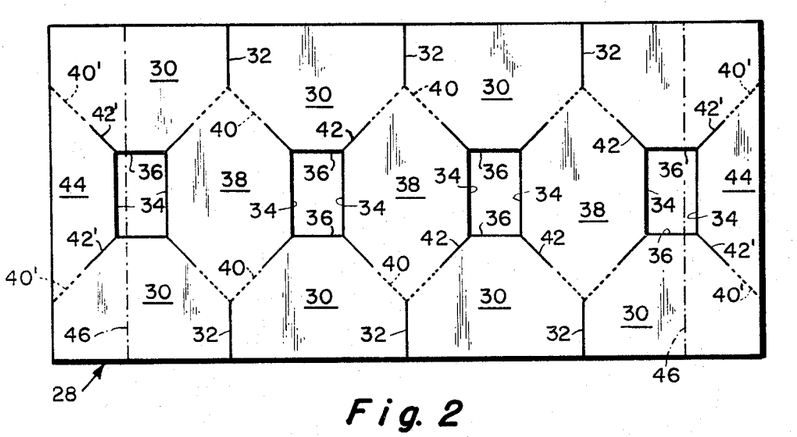
FIG. 2 is a plan view of a blank of sheet material with cut, slit, and score lines illustrated.

FIG. 2 illustrates a preferred embodiment of a one-piece blank 28 of sheet material from which a preferred embodiment of the spacer insert 26 is formed. The blank 28 may be fashioned from any sheet material, flexible at least in a direction parallel to its continuous web running direction. In a preferred embodiment of the present invention, the blank is fashioned from a web of single-faced corrugated board, having a flat sheet and a transversely pleated or corrugated sheet relatively adhesively united. It is within the course and scope of the present invention that any rigid or semi-rigid sheet, such as folding box board, double-faced corrugated board, foam film, or semi-rigid films such as celluous acetate, and polystyrene, and the like may be used. Energy absorbing requirements will dictate the kind of material to be used for each particular object, commodity and use.

The blank 28 (FIG. 2) is shown as formed from single-faced corrugated board with a smooth surface facing upwardly and the corrugated surface downwardly. Although FIG. 2 illustrates the invention in the form of a single blank, it will be apparent that a repeating pattern of blank portions, hereinafter described, may be formed in a continuous web of material, and selected lengths of the web severed therefrom to form blanks of desired lengths.

Panels 30 are formed in the blank 28. The panels 30 repeat their configuration longitudinally along the outer sides of blank 28. A pair of panels 30 opposingly face each other for each transverse row of cells to be erected. Each panel 30 is separated longitudinally from an adjoining panel 30 by a slit line 32. Each pair of transversely opposed panels 30, as formed in blank 28, is separated by a void or relieved portion described by transverse cut lines 34 and longitudinal cut lines 36.

The panels 30 are foldably connected to and separated from parallel hexagonal, truncated-parallelogram sections 38 by scorelines or creaselines 40 and slit lines 42.

The parallel hexagonal sections 38 are longitudinally spaced apart along the blank 28 with the major axis of each extending transversely there across, such that an extension of each axis forms a slit line 32. The scorelines 40 merge into the slit lines 42 in an extension of the same line. The scorelines 40 facilitates a folding connection between sections 38 and panels 30. The slit lines 42 completely sever the connection between the panels and the sections. The length of the scorelines 40 may be approximately ⅓ to ½ of the length of slit lines 42. In a preferred embodiment the score lines 40 and slit lines 42 may be at a 45° angle in relation to the lateral edges of blank 28.

Figure 13:
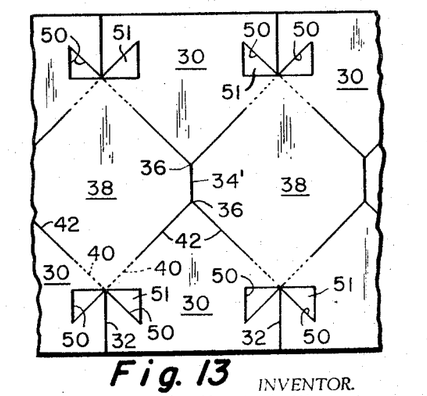
FIG. 13 is a fragmentary view of sheet material illustrating an alternate embodiment having space-saving bow tie portions removed therefrom.

When a cell height of at least approximately 2.57 times cell diameter is required, each longitudinal cut line 36 will become a point at an upper triangular portion of each panel 30, as shown in FIG. 13. In such a situation, a single cut line 34′ is formed by the merger of a pair of transverse cut lines 34.

Truncated triangular or trapezoidal sections 44 are formed at the right and left ends of blank 28. The truncated triangular sections 44 are foldably connected to and separated from a pair of opposing panels 30 by creaselines or scorelines 40′ and slit lines 42′. The scorelines 40′ extend and merge into slit lines 42′ in an extension of the same line. It can be seen that a truncated, triangular section 44 is formed by severing a hexagonal, truncated-parallelogram section 38 along its major axis on a transverse line extending between an opposing pair of slits 32.

The blank is basically a continuous sheet of a plurality of transversely opposed panels 30 and hexagonal, truncated-parallelogram sections 38, all in a connected longitudinally repeating pattern.

A blank may be extended to any number of transverse rows as desired, and accordingly be continuous to form any desired number of transverse rows of cells when erected. That is, sets of blanks may be partially severed from the web for dispensing and using as necessary.

In an alternate embodiment for use with containers having a rounded heel and a narrow neck, such as liqueur bottles, the cell separation may be reduced. In this embodiment panels 30 may be reduced in their transverse height by removing a strip of material of a desired width along the longitudinal edges of blank 28. This reduction in area results in a saving in web material.

The spacer insert 26 is erected from blank 28, by folding transversely opposing panels 30 toward one another, and longitudinally alternating the upward and downward folding of the transverse pairs. In FIG. 2, the left side transverse pair of panels 30 is moved and folded relatively upward into a position relatively perpendicular to the original position of blank 28. The adjoining pair of opposed panels to the right is moved and folded downward into a position relatively perpendicular to the original position of blank 28. The next adjoining opposed pair of panels 30 are moved and folded again relatively upward. This alternating pattern of relative up and down motion is repeated longitudinally for the entire length of blank 28. Truncated triangular section 44 on the left side of blank 28 may be folded to point relatively upward, whereas truncated triangular section 44 at the right side of blank 28 may be folded to point relatively downward.

Figure 10:
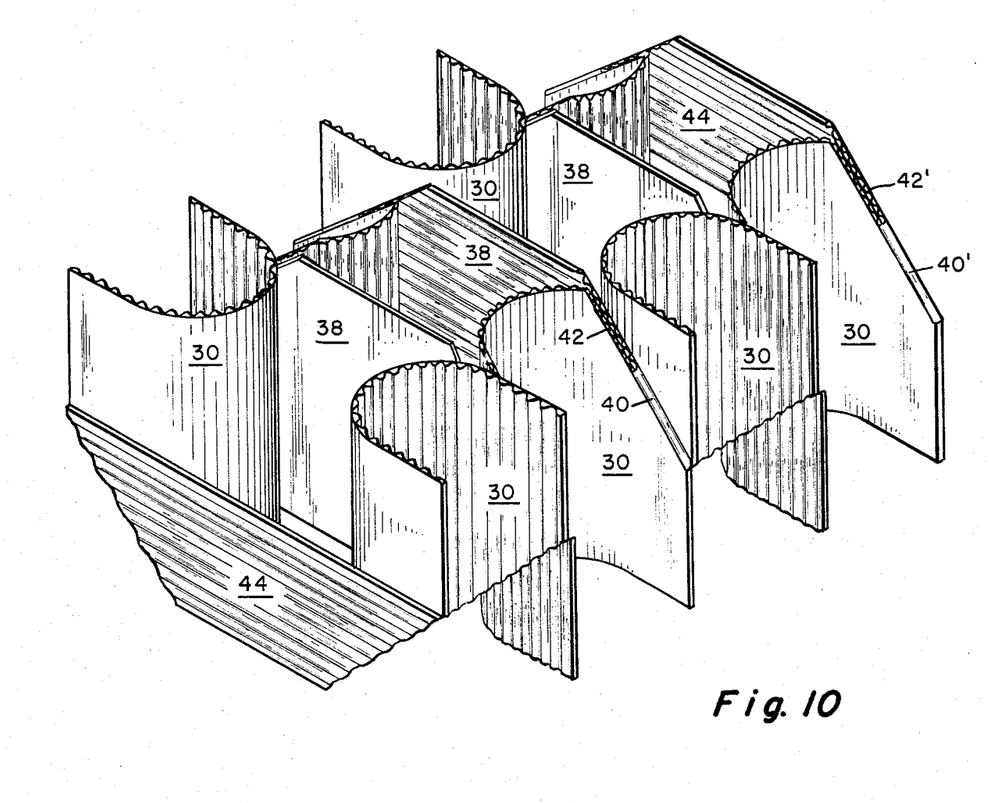
FIG. 10 is an isometric view of an assembled spacer insert.

As the aforesaid folds are made, the hexagonal truncated-parallelogram sections 38 are moved and pivoted into positions relatively perpendicular to the original position of sheet 28, so as to extend transversely of the insert. Folds for the aforesaid relative motions are made along scorelines 40 and 40′. When the spacer insert 26 is assembled, side panels 30, parallel hexagonal sections 28, and trapezoidal sections 44 are relatively perpendicularly positioned with respect to the original positioning of blank 28. (See FIGURE 10.)

Figure 3:
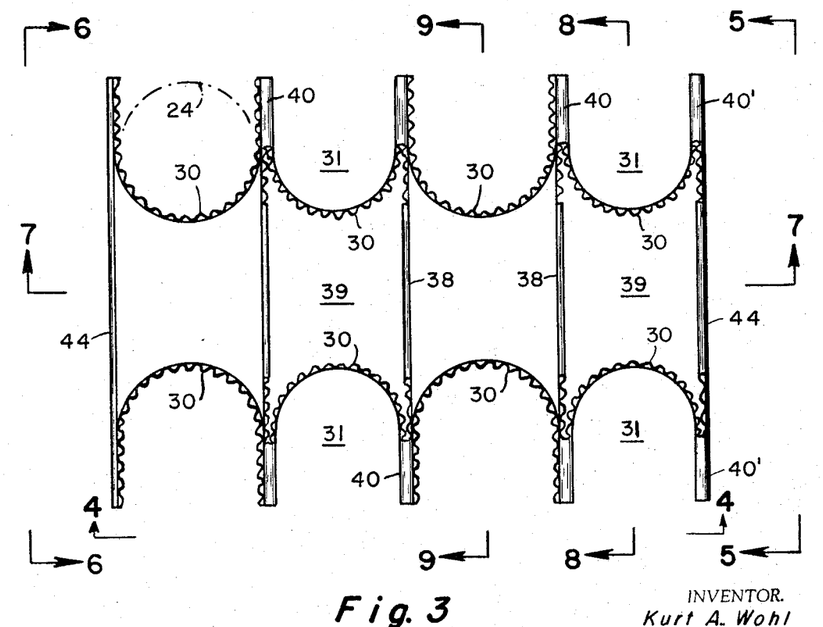
FIG. 3 is a plan view of an erected spacer insert unit.

The spacer insert 26, when erect defines two transversely oriented outboard or outside cells 31 and one internal cell 39 for each transverse row. As shown in FIG. 3, outboard cells 31 appear U-shaped when viewed in plan, and oppose each other with the open end of each U facing transversely outwardly from the insert. The outboard cells 31 are separated laterally by the internal cell 39. A row of internal cells 39 are formed by the spaced-apart parallel relationship of transversely-extending hexagonal truncated-parallelogram sections 38, and the back partition walls or opposed closed ends of outboard cells 31.

When the spacer insert 26 is erect, the hexagonal sections 38 extend the full width of the carton, and may be equal to three times the diameter of the contents of one cell plus an allowance of twice the thickness of the board used. The height of the sections 38 when erect determine the transverse partition height of cells 39, and is preferably equal to the height of the cell contents. As best seen in FIG. 3, the opposite end of each hexagonal section 38 is joined to two adjacent panels 30 along oppositely folded crease lines 40 and provides a small area of triple thickness of board adjacent such juncture.

As also shown in FIG. 3, at least one thickness of board divides the various cells from one another. In addition, the utilization of single-faced corrugated board provides a considerable number of vertical flutes which not only impart improved structural strength against vertical compression forces, but also impart a degree of cushioning against horizontal impact. This protection is available in all cell rows, and is distributed at the important points of the carton area which may be subject to compression and impact forces.

Figure 4:
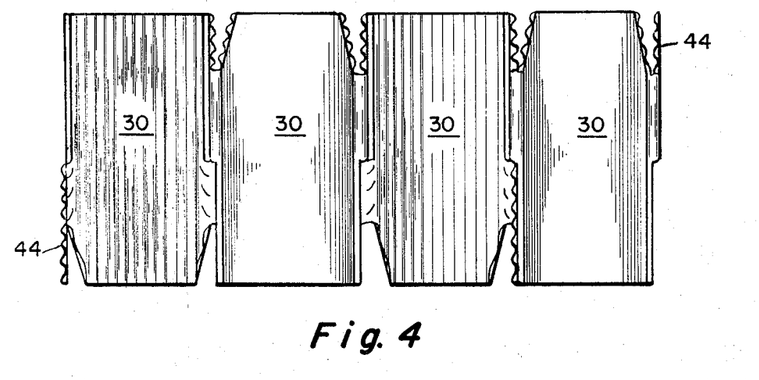
FIG. 4 is a front elevational view of an erected spacer insert taken on line 4—4 of FIG. 3.
Figure 5:
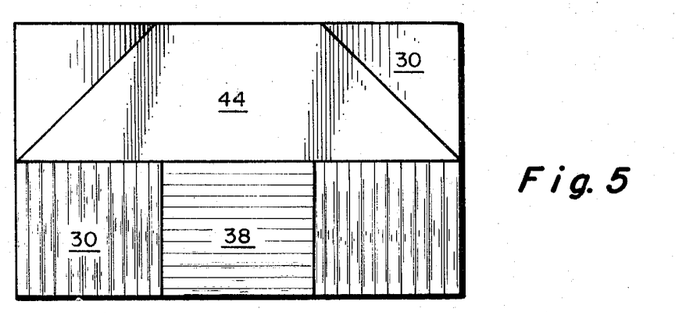
FIG. 5 is a right end view of the assembled spacer insert taken along line 5—5 of FIG. 3.
Figure 6:
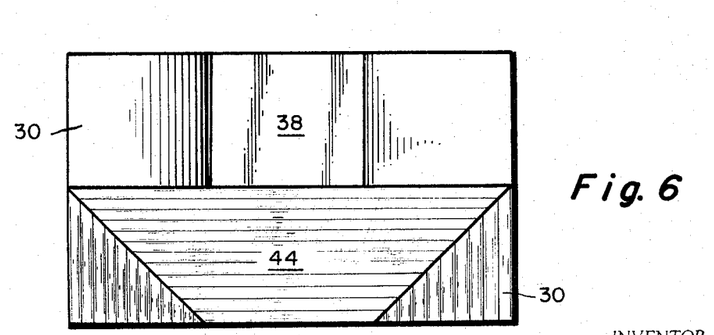
FIG. 6 is a left end view of the assembled spacer insert as seen on line 6—6 of FIG. 3.
Figure 7:
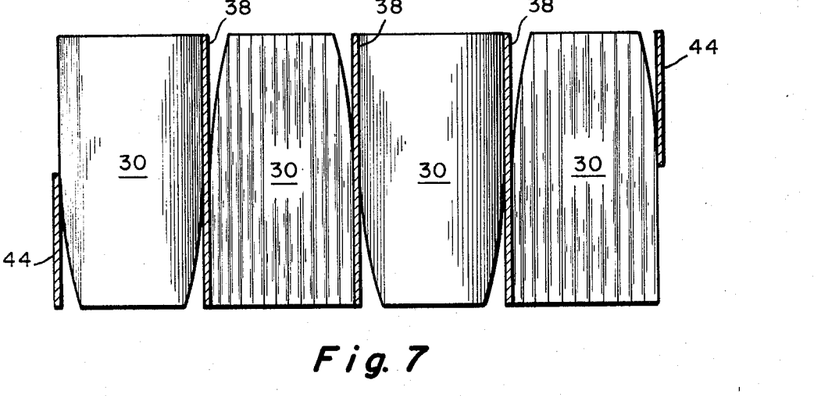
FIG. 7 is a sectional view of the assembled unit taken along line 7—7 of FIG. 3.
Figure 8:
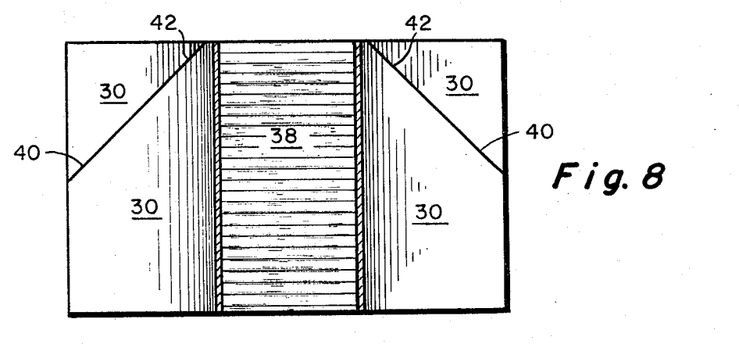
FIG. 8 is a sectional view of the assembled unit taken along line 8—8 of FIG. 3.
Figure 9:
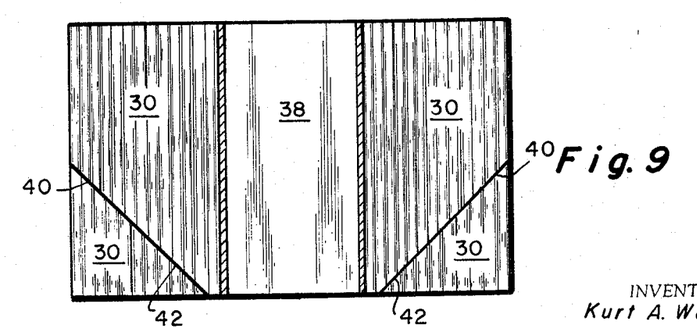
FIG. 9 is a sectional view of the assembled unit taken along line 9—9 of FIG. 3.

When viewing the erected panels 30 in elevation, as shown in FIG. 4, they appear to be straight sided for approximately half their vertical height with the side edges tapering or curving inwardly to form a truncated triangle for approximately the other half of cell height. The position of the apparent truncated triangle, as shown in FIGS. 4 and 7, alternates longitudinally from top to bottom in adjoining panels.

Figure 11:
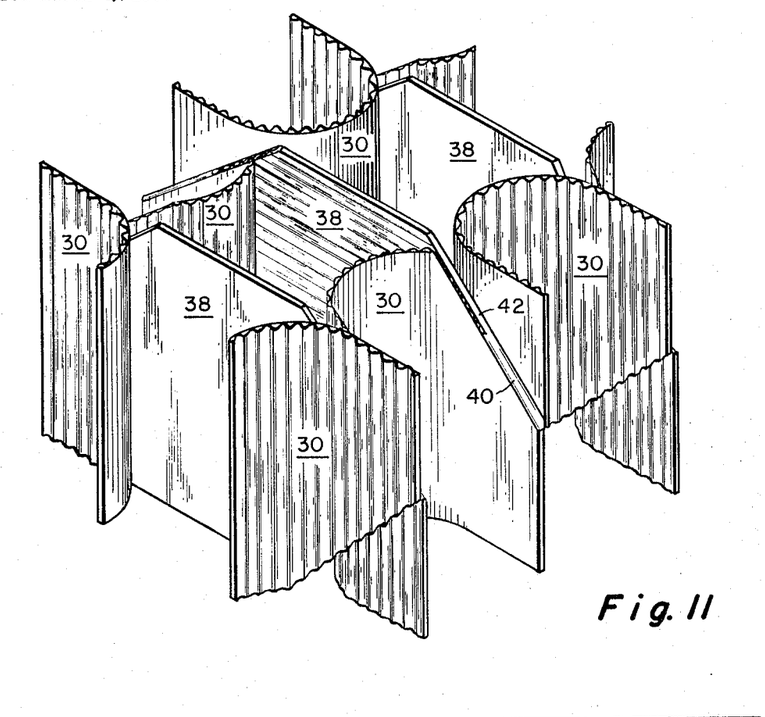
FIG. 11 is an isometric view of an alternate embodiment of a spacer insert illustrating a shortened end cell construction.

Referring now to FIG. 11, an alternate embodiment of the spacer insert is shown having an open sided end cell construction. To form this embodiment the blank 28 (FIG. 2) is severed on the left and right end along cut lines such as indicated by chain lines 46 extending transversely across blank 28. In this modified construction, the cut lines are preferably located somewhat outside the mid-point of longitudinal cut lines 36. The severing at such location insures that full separation between the contents packages in such end cells occurs at tangent points between such objects. This modification not only provides all the functions of separation as in the preferred form of spacer insert, but also results in substantial saving in board area. That is, in the case of a one-dozen pack, approximately one-fourth of the length of the web area is eliminated. In this embodiment, as shown in FIG. 11, the end outside cells of the insert, formed by the end side panels 30, have the shape of a truncated U, with the remainder of the cell being provided by the corner walls of an enclosing carton.

Figure 12:
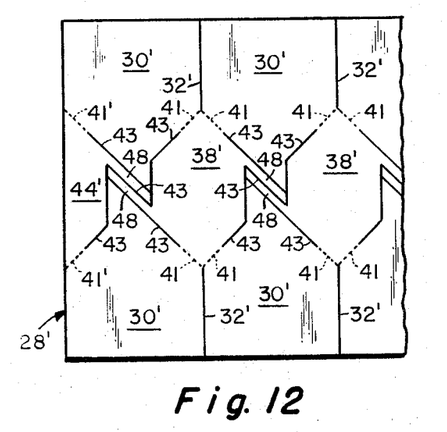
FIG. 12 is a fragmentary view of sheet material illustrating a further embodiment having an extension partition unit for protecting tall containers.

A further embodiment shown in FIG. 12 is useful if required cell height is from approximately 2.5 to 3 times the cell diameter. Alternating hooks or salients 48 are attached to both hexagonal truncated-parallelogram sections 38′ and truncated triangular sections 44′, to provide full height separation between the center cells of adjacent transverse rows.

The panels 30′ (FIG. 12) repeat their configuration longitudinally along the outer sides of the blank 28′. A pair of panels 30′ opposingly face each other for each transverse row of cells to be erected, and each panel is separated longitudinally from an adjacent panel 30′ by a slit line 32′.

The panels 30′ are foldably connected to and separated from the hexagonal sections 38′ by scorelines 41 and slit lines 43. The scorelines 41 merge into the slit lines 43 in an extension of the same line. The scorelines 41 are formed to facilitate a folding connection between sections 38′ and panels 30′. The slit lines 43 completely sever the connection between the panels 30′ and the sections 38′, and define the outline of alternating salients 48.

Only the left end of blank 28′ is shown in FIG. 12, however, it is apparent that the right end is similar but with section 44′ reversed. Hook 48 is connected to the truncated triangular section 44′, and section 44′ is foldably connected to and separated from a pair of opposing panels 30′ by scorelines 41′ and slit lines 43. The scorelines 41′ extend and merge into the slit lines 43. As in the preferred embodiment, it can be seen that a truncated, triangular section 44′ is formed by longitudinally severing a hexagonal, truncated-parallelogram section 38′ in a transverse line extending between opposing slits 32′.

To erect a spacer insert from the blank 28′, the blank 28′ is manipulated as previously disclosed for the preferred embodiment of the present invention.

Figure 14:
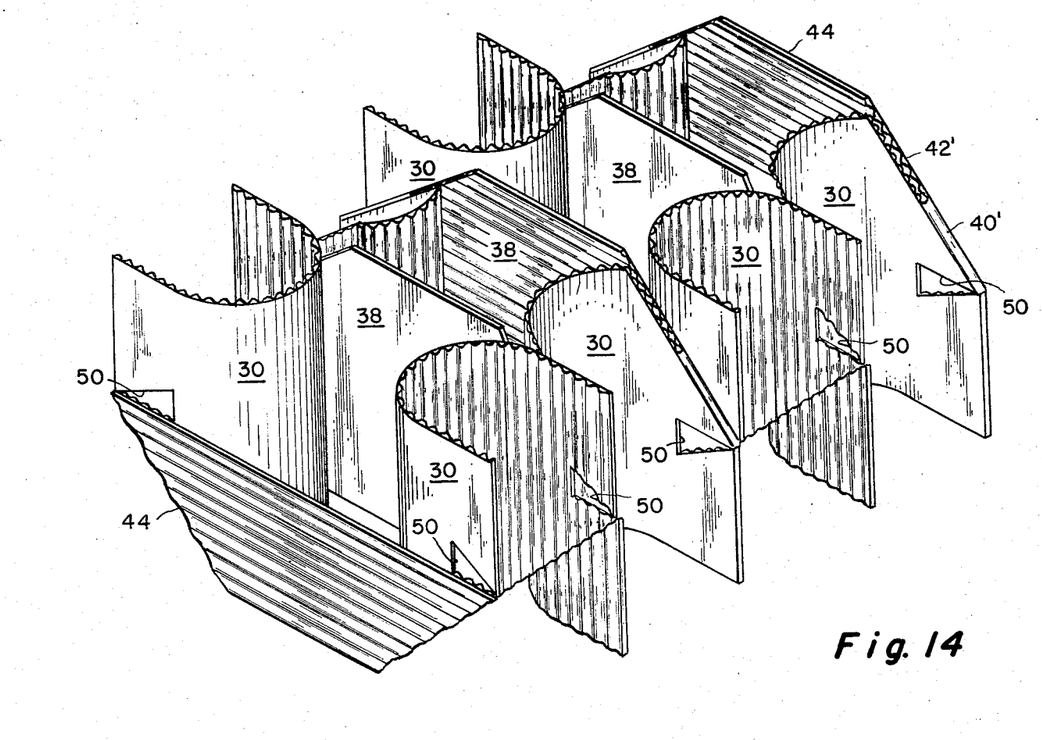
FIG. 14 is an isometric view of an erected bow tie cutout unit.

Referring now to FIG. 13, relief cut lines 50 are shown formed in panels 30. Severing the material on cut line 50 removes relief sections 51, shown in the form of a bow tie configuration, from panels 30. The relief sections 51 are preferably located in panels 30 with an axis of revolution along the major axis of parallel hexagon 38 near the inner extremity of slit 32. When this embodiment is erected as shown in FIG. 14, the separation between two adjacent U-shaped cells is reduced from three thicknesses of board to two thicknesses of board. The removal of the bow tie sections improves the relative fit of center and outboard cells in the same transverse row and reduces the length of the carton encapsulating the structure.

The hereinbefore referred to preferred embodiment and modifications thereof may best be used for, but are not limited to, the packaging and separating of circular and oval objects. While rectangular and square objects may be packaged in containers using the aforementioned spacer inserts, the following embodiment is preferred for rectangular and square objects.

Figure 15:
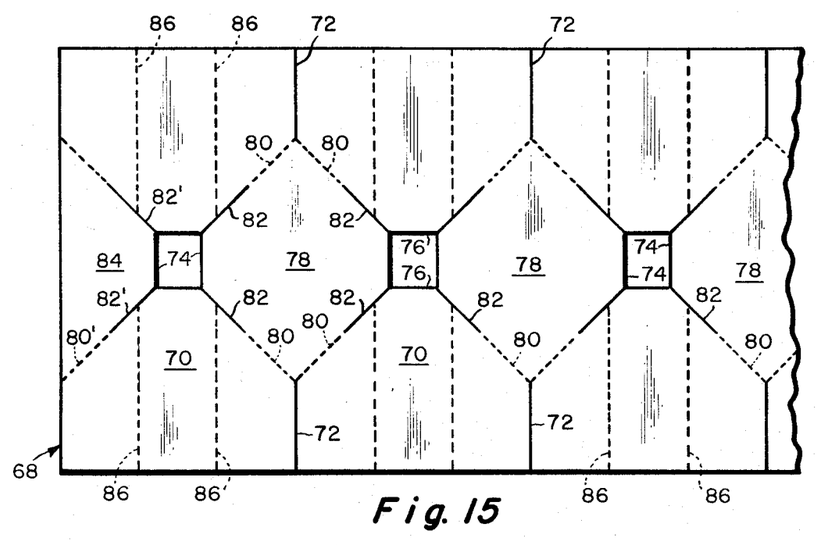
FIG. 15 is a plan view of sheet material illustrating a layout for a square cell unit.

Referring now to FIG. 15, a fragmentary view of a partition blank 68 is shown having a repeating geometric pattern. The blank 68 may be fashioned from any suitable sheet material which is flexible at least in a direction parallel to its continuous web running direction. The possible materials indicated within the scope of the preferred embodiment may be used in the square cell embodiment. The blank may be cut to any desired length, and a repeating pattern of blank portions, hereinafter described, may be formed in a continuous web of material, and selected lengths severed therefrom.

Panels 70 are formed in the blank 68 and repeat their configuration longitudinally along the outer sides of such blank. A pair of such panels opposingly face each other for each transverse row of cells to be erected. Each panel 70 is separated longitudinally from an adjoining panel 70 by a slit line 72. Each pair of transversely opposed panels 70 is separated by a void described by transverse cut lines 74 and longitudinal cut lines 76.

The panels 70 are foldably connected to and separated from hexagonal, truncated-parallelogram sections 78 by scorelines or creaselines 80, and slit lines 82. The scorelines 80 merge into the slit lines 82 in an extension of the same line. The scorelines 80 facilitate a foldable connection between section 78 and panels 70, and slit lines 82 completely sever the connection between such panels and the section.

The longitudinal cut lines 76 may become the point of an upper triangular portion on the panels 70, when an increase in cell height is required, and would appear similar to the construction shown in FIG. 13. In such instance, a single cut line is then formed by the merger of a pair of transverse cut lines 74.

Truncated triangular sections 84 are formed at the end of blank 68. The truncated triangular sections 84 are foldably connected to and separated from a pair of opposing panels 70 by scorelines or creaselines 80′ and slit lines 82′. The scorelines 80′ extend and merge into the slit line 82′ in an extension of the same line. It can be seen that a truncated, triangular section 84 is formed by severing a hexagonal, truncated-parallelogram section 78 in a transverse line extending between an opposing pair of slits 72.

Each panel 70 is creased by a pair of transverse scorelines 86. The scorelines 86 divide the panels 70 into three distinct and foldably connected portions.

Figure 16:
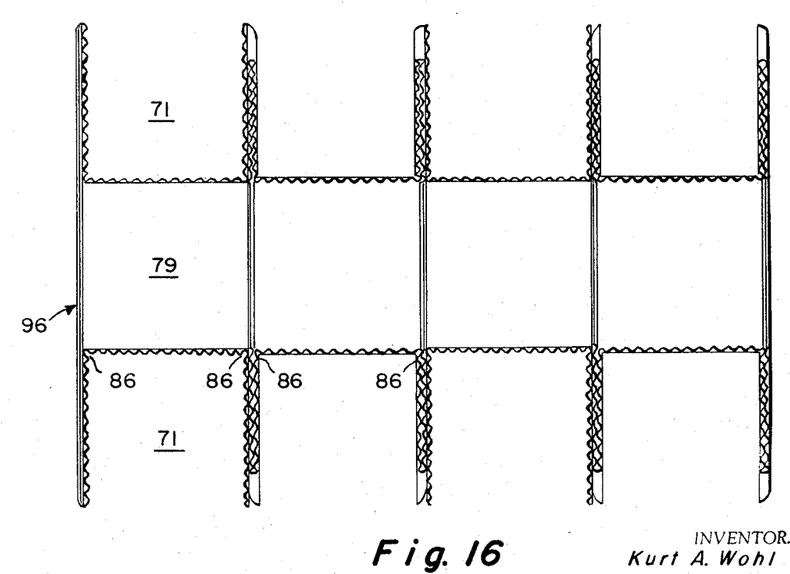
FIG. 16 is a plan view of an assembled square cell unit.

To erect a spacer insert 96 (FIG. 16) from the blank 68, the blank is manipulated in a manner similar to erecting a preferred embodiment of the present invention. However, in the erection of the present embodiment, folds are required along transverse scorelines 86 to provide a four-sided cell configuration. The spacer insert 96 defines two transversely oriented outboard or outside cells 71 and one internal cell 79 for each transverse row. The said cells have a four-sided configuration. If desired, the blank 68 may be modified in the manner similar to the modifications disclosed for the blank 28.

The present invention thus provides a spacer insert which can be erected from a flat sheet of material and inserted into a carton for separating objects to be stored or shipped. The protective cells formed by this invention prevent circular, oval, square, rectangular, and the like objects from injuring one another. The design of the spacer inserts provides a partitive structural unit requiring a minimum of material in comparison to standard partition members. The blanks are easily stored and require little packing space. The blanks may be provided on a continuous web of material to be severed in desired lengths at a user's location and assembled mechanically or by hand in any desired length. The spacer insert provides a weight reduction in that less material is used. A lighter and tighter package is provided through less overlapping of components. Cost of packaging is reduced by reducing the amount of material required for the same packaging protection. In addition vertical compressive strength is provided in needed areas, and an economical insert is provided because less material and simpler construction are required.

Although the present invention has been described with respect to specific details of certain embodiments thereof, it is not intended that such details be limitations upon the scope of the invention except insofar as set forth in the following claims.

I claim:
1. A one-piece blank adapted to form a spacer insert comprising, a plurality of panels arranged in oppositely oriented pairs transversely across said blank; parallel hexagonal sections intermediate said oppositely oriented panels; trapezoidal sections formed at each end of said blank; scorelines foldably connecting said trapezoidal sections and said hexagonal sections to said pairs of panels; and cut lines and scorelines separating portions of said hexagonal sections and said trapezoidal sections from said panels.

2. The one-piece blank as defined in claim 1 wherein relieved portions transversely separate said opposed panels and longitudinally separate said parallel hexagonal sections from each other and from trapezoidal sections; and slits longitudinally separating each of said panels from an adjoining panel.

3. The one-piece blank as defined in claim 2 wherein relief sections are removed from said panels at a point in the vicinity of the inner extremity of the said slits.

4. The one-piece blank as defined in claim 1 wherein hook portions are formed integral with and project from said hexagonal sections and said trapezoidal sections.

5. A one-piece blank as defined in claim 4 wherein relief sections are removed from said panels at a point in the vicinity of the inner extremity of the slit longitudinally separating said panels.

6. The one-piece blank as defined in claim 1 wherein bow tie sections are removed from adjacent ones of said panels for reducing the number of thicknesses of board between cells formed thereby when said blank is erected.

7. A blank for making a partitive structural unit comprising a plurality of spaced-apart hexagonal sections having a major axis oriented transversely across said blank; a plurality of opposing pairs of panels connected to the said hexagonal sections by creaselines; a truncated triangular section connected to a pair of said opposing panels adjacent each longitudinal end of said blank; oblique slit lines longitudinally separating portions of said hexagonal sections and portions of said truncated triangular sections from said panels; and transverse slits severing longitudinally adjoining panels.

8. The blank as defined in claim 7 wherein transverse cut lines and longitudinal cut lines define a plurality of void portions, one for transversely separating each pair of opposed panels and longitudinally separating adjacent hexagonal sections.

9. A continuous web of material for making blanks of a desired length for erecting partition members comprising panels longitudinally oriented along outer edges of said web edges; said panels arranged in transversely oriented pairs opposingly facing each other; connected to the opposingly oriented pairs of panels by scorelines are hexagonal sections; slits separate longitudinally adjoining panels from each other; and transverse cut lines and slit lines separate said panels and said hexagonal, truncated-parallelogram sections.

10. The continuous web of material as defined in claim 9 wherein pairs of longitudinal cut lines and pairs of transverse cut lines form a plurality of relief portions, each of said portions separates each pair of transversely opposed panels and each adjoining hexagonal, truncated-parallelogram section.

11. The continuous web as defined in claim 9 wherein bow tie cut lines at the inner extremity of said slits define bow tie sections in said panels.

12. A continuous web of foldable material for making blanks of a desired length from which partition members may be erected comprising transversely oriented hexagonal, truncated-parallelogram sections; connected to the said hexagonal, truncated-parallelogram sections by scorelines are a plurality of opposing pairs of panels; a slit longitudinally separates adjoining panels; salients project from said hexagonal, truncated-parallelogram sections; and slit lines define said salients and separate adjoining hexagonal, truncated-parallelogram sections.

13. A foldable spacer insert blank of the type having hexagonal sections; a plurality of opposing pairs of side panels are connected to the hexagonal sections by scorelines; transversely-truncated pairs of end panels connect to the hexagonal sections; slits sever connection between longitudinally adjoining side panels; slit lines separate hexagonal sections from truncated panels and from the opposing pairs of panels; and transverse cut lines separate longitudinally adjoining hexagonal sections.

14. The blank as defined in claim 13 wherein pairs of transverse cut lines and pairs of longitudinal cut lines define rectangular relief sections each of which separates a pair of transversely opposed panels and longitudinally adjoining hexagonal sections.

15. A flat blank of foldable material comprising side panels in pairs opposingly facing each other in a transverse relationship across said blank and repeating their configuration longitudinally along the outer edges of said blank; hexagonal sections extending across said blank and repeating their configuration longitudinally down the center of said blank; truncated triangular sections transversely oriented across said blank at the respective ends thereof; slits separating adjoining side panels from one another; scorelines foldably connecting said hexagonal and said truncated triangular sections to the side panels; slit lines extending from said scorelines and completely severing connection between the panels and said hexagonal sections and said truncated triangular sections; transverse cut lines severing connection between longitudinally adjacent hexagonal sections and truncated triangular sections.

16. A blank as defined in claim 15 wherein pairs of transverse cut lines and pairs of longitudinal cut lines define relief portions each said portion separating a pair of transversely opposed side panels.

17. A continuous web of foldable material for making blanks from which to erect a square cell structural unit comprising a plurality of pairs of opposingly oriented side panels having their configuration repeating longitudinally along the outer edges of said web; hexagonal, truncated-parallelogram sections; slits separate longitudinally adjoining panels; scorelines foldably connect said hexagonal, truncated-parallelogram sections to the side panels; a plurality of transverse cut lines sever connection between adjacent hexagonal, truncated-parallelogram sections; and a pair of transverse scorelines in each side panel partially sever the said panels into three foldably connected portions.

18. The continuous web of material as defined in claim 17 wherein a plurality of relieved portions are described in said web by pairs of transverse cut lines and pairs of longitudinal cut lines for transversely separating said opposed side panels and longitudinally separating said hexagonal sections.

19. An improved blank construction for forming a continuous one-piece packaging insert having a plurality of partition wall portions forming cellular units for packaging a plurality of articles in cushioned spaced-apart relationship with a container which comprises, a longitudinally extending web of sheet material, a plurality of longitudinally spaced parallel hexagonal sections formed in said web with the major axis thereof extending transversely across the web, a plurality of transversely-opposed side panels extending longitudinally along side edge portions of said web and connected to edge portions of said parallel hexagonal sections, said side panels being transversely spaced apart intermediate said hexagonal section, and scorelines foldably connecting portions of said side panels with said parallel hexagonal sections to foldably erect a one-piece partition insert from said blank.

20. An improved blank construction as defined in claim 19 wherein a plurality of rectangular relieved portions are formed in said blank transversely separating said opposed side panels and longitudinally separating said hexagonal sections, and slit lines extend outwardly from corner portions of said rectangular relieved portions between portions of said parallel hexagonal sections and said side panels.

21. An improved blank construction as defined in claim 19 wherein a trapezoidal end section is formed along each longitudinal end of said blank between a pair of said opposed side panels adjacent such end, and each said trapezoidal end section being foldably secured to such opposed side panels along a score line which is partially slit along its inner extent.

22. An improved blank construction as defined in claim 19 wherein relief portions are formed in said side panels having a symmetry on opposite sides of the major axis of said parallel hexagonal sections to minimize wall thickness between the various cells of the erected partition.

References Cited by the Examiner

UNITED STATES PATENTS

| | | | |
|---|---|---|---|
| 2,140,001 | 12/1938 | Davitt | 217—23 |
| 2,348,397 | 5/1944 | Lindley et al. | 229—42 X |
| 2,381,543 | 8/1945 | Inman | 217—23 X |
| 2,830,749 | 5/1958 | Lauritzen | 229—42 X |

FOREIGN PATENTS 1,218,604  5/1960  France.

GEORGE O. RALSTON, *Primary Examiner.*